Figure 1:
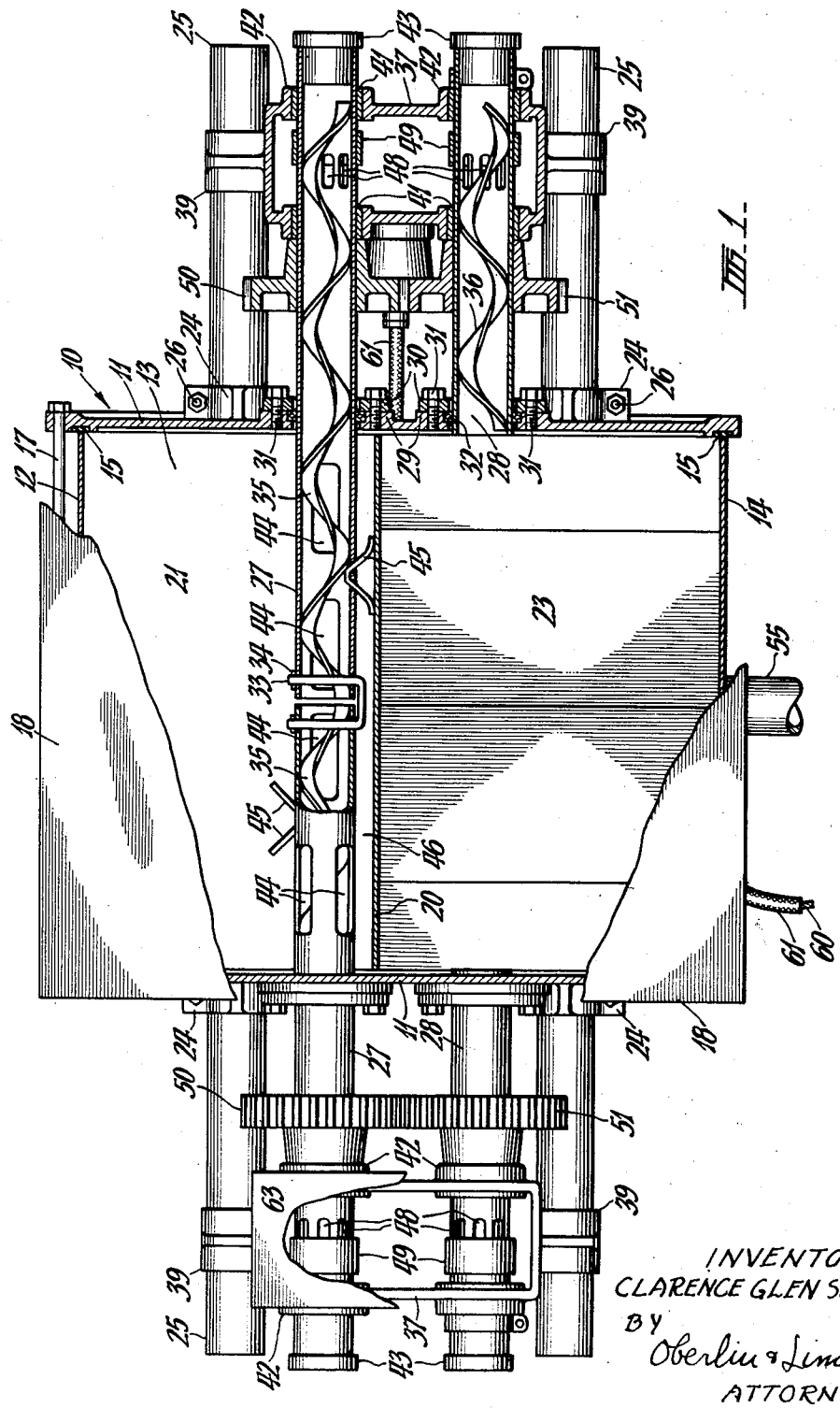

April 22, 1958 C. G. SMITH 2,831,612
SEED OR FERTILIZER FEEDER FOR A CULTIVATOR
OR OTHER IMPLEMENT
Filed Dec. 17, 1956 2 Sheets-Sheet 1

INVENTOR
CLARENCE GLEN SMITH
BY
Oberlin & Limbach
ATTORNEYS.

INVENTOR
CLARENCE GLEN SMITH
BY Oberlin & Limbach
ATTORNEYS.

United States Patent Office 2,831,612
Patented Apr. 22, 1958

2,831,612

SEED OR FERTILIZER FEEDER FOR A CULTIVATOR OR OTHER IMPLEMENT

Clarence Glen Smith, Toowoomba, Queensland, Australia

Application December 17, 1956, Serial No. 628,760

4 Claims. (Cl. 222—142)

This invention relates to a seed or fertilizer feeder for a cultivator or other implement.

Chisel plows are well known and widely used, such an implement having several rows of chisel-point tines suspended from a wheeled frame adapted to be drawn by a tractor. As such an implement is devised to cultivate by penetrating into the subsoil without bringing it to the surface, and to aerate the soil, but at the same time to leave stubble more or less undisturbed on the surface of the soil to provide a valuable mulch, it follows, then, that there must be a considerable clearance between tines so that the trash will not be caught up by them.

Hitherto, such implements have not been provided with means for sowing seed or for feeding fertilizer to the soil; and to adapt conventional means for such purposes to an implement of this type would introduce a number of disadvantages. Notably, owing to the displacement of the tines, a seed hopper, for example, with conduits for gravitational feeding of seed to boots applied to the tines would necessitate the positioning of the hopper at an unduly great height above the frame, and the provision of a number of considerably extended feed conduits.

One of the principal objects of my present invention is to provide means for novel and improved character whereby seed and/or fertilizer may be conveniently and efficiently fed to seed bed attachments of a chisel plow, cultivator or other implement.

Another salient object of the invention is to provide a seed feeder which is particularly effective in planting seed of the light hairy type, such as, for example, buffel seed, without any necessity to use a carrier medium, such as sawdust, earth or bran, as has generally been the practice hitherto, and without there being any likelihood of the seed becoming packed or damaged. A further object of the invention is to provide such a feeder which is capable of delivering seed at a finely controlled rate, with the consequent advantage that seed which is particularly expensive by weight may be sown without wastage and to maximum effect. Still further objects of the invention are to provide a seed or fertilizer feeder which is simple and economical to manufacture, which may be readily adapted to suit widely different types of implements, and of which the feed will be positive and substantially uniform.

According to my invention, I provide a seed or fertilizer feeder for a cultivator or other implement, the feeder including a hopper which is adapted to contain a quantity of seed, or of fertilizer, or of both, preferably in separate compartments. From the hopper there lead one or more rotatable tubular conduits, adapted to receive from the hopper seed, or fertilizer or both; and each of the rotatable conduits has at least one outlet therefrom spaced from the hopper, and preferably provided with means whereby its effective area may be adjustably varied. Within each of the rotatable conduits is a co-axial helical conveyor, rotatable with the conduit, and preferably having a clear axial passage, the helical conveyor being such that, upon rotation of the associated conduit, seed or fertilizer will be conveyed from the hopper to the outlet or outlets of the conduit from which it is delivered, for example, to seed-bed attachments of the implement. In order to rotate the conduit or conduits, I prefer to provide a drive from a land-wheel, which is rotated when the implement proceeds. Each of the conduit outlets preferably consists of a series of slotted openings in the conduit between axial limits, the means for adjusting the outlet consisting of a sleeve slidable on the conduit to limit the effective areas of these slotted holes. Each of the conduits may be made up of a number of tubular elements interconnected co-axially, each part having an outlet therefrom, the parts being of such lengths that the device may be assembled in such manner as to suit varying arrangements of tines, for example, on different cultivators or other implements. Other features of the invention will become apparent from the following description.

Figure 2:
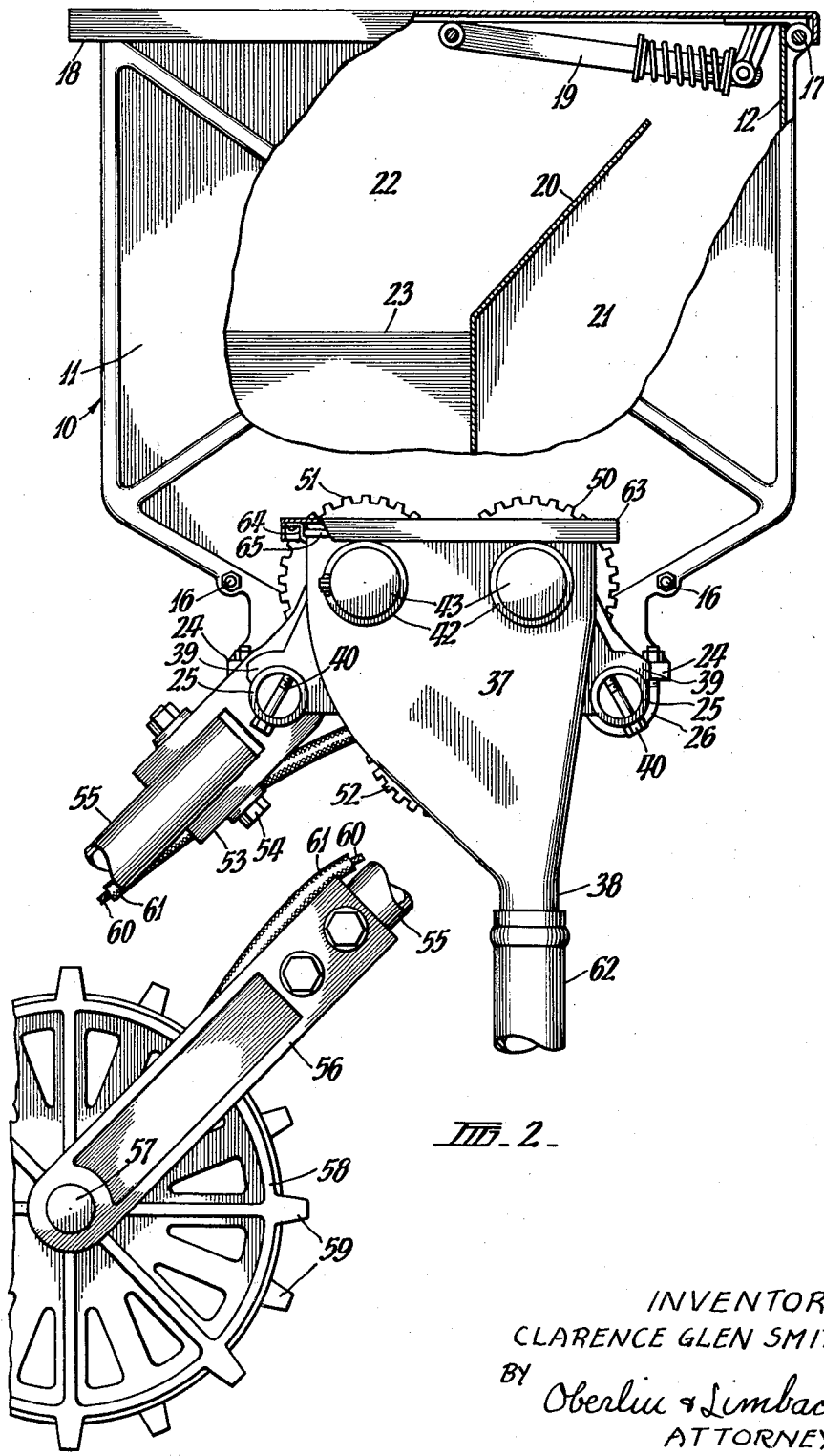

In order that a preferred embodiment of the invention may be readily understood and put into practical effect, I now refer to the accompanying drawings, wherein:

Fig. 1 is a partly broken-away plan view of a seed and fertilizer feeder according to the invention, and Fig. 2 is a partly broken-away side elevational view of the feeder shown in Fig. 1.

The seed and fertilizer feeder shown includes a centrally disposed hopper 10, having a pair of cast side plates 11 and a sheet metal element shaped to form the front 12, bottom 13 and back 14, the side edges of this element bearing upon resilient gasket strips 15 housed in the inner sides of the side plate 11, which are interconnected by transverse securing bars 16, and a transverse hinge bar 17 across the upper front part of the hopper. Pivotally mounted on this hinge bar is a hopper lid 18; and a spring-loaded toggle device 19 associated with the said lid and the hopper is adapted either to hold the lid closed in spring-loaded manner, or to hold it in raised or open position.

A sheet metal transverse partition 20 extending vertically up from the hopper bottom 13 for some distance, and then inclining upwardly and forwardly, divides the interior of the hopper into a seed compartment 21, within the forward part of the hopper, and a fertilizer compartment 22 within the rear part of the hopper. Within the fertilizer compartment 22 there is disposed a longitudinal sheet-metal divider 23, which is gable-shaped, and adapted to direct fertilizer down to either side of the fertilizer compartment.

Cast integrally with each of the hopper side plates 11, at the bottom thereof, are two hopper mounting brackets 24, the four brackets seating upon a pair of parallel transverse mounting tubes 25, held to the said mounting brackets by U-bolts 26. These mounting tubes may be readily secured on a cultivator or other implement, by means of U-bolts, for example. The mounting tubes 25 extend for some distance to either side of the hopper 10.

Leading from both sides of the lower part of the seed compartment 21 are two similar co-axial seed conduits 27; and leading from both sides of the lower part of the fertilizer compartment 22 are two similar co-axial fertilizer conduits 28. The axes of all four conduits are normally horizontal, and those of the seed conduits are at the same level as those of the fertilizer conduits. Each of the four conduits 27 and 28 passes rotatably through an oversize axis bore of a boss 29 formed integrally with a hopper side plate 11, an annular cover plate 30 secured to the boss 29 by screws 31 retaining, in an annular recess in the outer part of the boss about its bore, an annular felt or like washer 32, through which the conduit passes. Each conduit, then, will be capable of a degree of radial movement, but the washer 32 about the conduit will form an effective seal.

The inner ends of the fertilizer conduits 28 are about flush with the inner faces of the hopper side plates 11; but the inner ends of the seed conduits 27 meet, or almost meet, in the middle of the hopper, and are interconnected in a somewhat flexible manner by a U-shaped fastening pin 33, the arms of which are passed through corresponding circumferential holes through the inner parts of the said conduits, and retained by retaining pins 34.

In each of the seed conduits 27 there is fitted closely a helical conveyor 35, consisting of a sheet metal element shaped to form a helix with an axial passage therethrough. The two helices of the two seed passages are arranged oppositely.

In each of the fertilizer conduits 28 there is also a closely fitted helical conveyor 36, similar to those of the seed conduits, the conveyor in the right-hand fertilizer conduit being arranged oppositely to the conveyor in the right-hand seed conduit, and the conveyor in the left-hand fertilizer conduit being arranged oppositely to the conveyor in the left-hand conveyor. In all four conduits, the conveyors extend from the inner ends of the conduits to positions near to the outer ends of the conduits; and consequently, of course, the conveyors of the seed conduits are considerably longer than those of the fertilizer conduits.

To each side of the hopper there is provided a cast metal dropper box 37, rectangular at its top, and diminishing downwardly to a cylindrical outlet 38. Each of the dropper boxes is provided, to front and to rear, with integrally cast mounting brackets 39, the two mounting brackets of each dropper box seating upon the parallel mounting tubes 28, holding screws 40, passed through diametrically opposed holes in the said tubes and engaging in tapped apertures in the said mounting brackets 39 serving to hold the dropper box firmly in place.

To each side of the hopper 10, the seed conduit 27 and the fertilizer conduit 28 pass through the upper part of the dropper box, in each case being journaled in coaxial bearings 41 in bosses 42 cast integrally at both sides of the dropper box. The outer ends of the said conduits, extending for some distance beyond the dropper box, are closed by rubber or like plugs 43 inserted thereinto.

The open inner ends of the fertilizer conduits 28 constitute inlets thereinto; but the inlets to the seed conduits 27 consist of holes 44 formed through the parts of the said conduits located within the hopper. These inlet holes 44, in each seed conduit 27, consist of two series of three equally spaced longitudinally slotted apertures. These inner parts of the seed conduits are also provided with agitators 45, each consisting of a strip of rubber or the like passed in through a small radial hole in the conduit, and then out through a similar adjacent hole, so that the rubber strip assumes a V-shape. When the seed conduit is rotated in clockwise direction with reference to Fig. 2, each of these agitators is brought against the hopper bottom 13, so that its arms become somewhat splayed apart; and they are retained in such position as they are carried up over a baffle, curved arcuately in cross-section, between the hopper bottom 13 and the lower vertical part of the partition 20, the position of this baffle being indicated at 46. The baffle, on being carried over clear of the partition 20 is free to resume its normal shape.

Each of the seed conduits 27 and fertilizer conduits 28 has a number of outlet holes 48 into the dropper box 37, these outlet holes, in each case, consisting of a series of equally spaced longitudinally slotted holes through the conduit. A short tube 49 of rubber or the like fitted upon the conduit within the dropper box, may be moved along the conduit to mask the outlet holes 48 to desired degree, to reduce the effective area of the conduit outlet. If desired, similar means may be provided to adjust the effective area of the inlet to each of the seed conduits.

To each side of the hopper 10, the seed conduit 27 has secured thereon a spur gear 50, its hub abutting against a boss 42 of the dropper box 37; and meshing with this spur gear is a similar spur gear 51 similarly positioned and secured on the fertilizer conduit 28. At one side of the hopper 10, the spur gear 50 meshes with a still further similar spur gear 52, rotatable on a stub-axle extending from the appropriate dropper box 37 towards the hopper 10.

Pivoted on the rear mounting tube 25, between the rear mounting brackets 24 of the hopper 10, is a fork 53, between the arms of which there is pivoted, by a bolt 54, its axis perpendicular to that of the said mounting tube, the upper end of a rearwardly and downwardly inclining tubular arm 55, to the lower end of which is secured a fork 56. Between the arms of the fork 56, is rotatably mounted an axle 57 to which is secured a land-wheel 58, this land-wheel having a number of teeth or projections 59 extending radially from its periphery. This land-wheel is adapted, when the seed and fertilizer feeder is mounted on an implement, to rest upon the ground at the rear of the implement so that, when the implement is drawn forward, the land-wheel will be rotated. A flexible drive cable 60, within a flexible sheath 61, is operatively connected at one end of the axle 57 of the land-wheel 58, for example, through a bevel-gear drive (not shown). The other end of the said drive cable is connected operatively to the spur gear 52.

The outlet 38 from each of the dropper boxes 37 has engaged thereon the upper end of a flexible delivery hose 62, which may be led down to a seed boot (not shown) at the rear of a tine or the like (not shown) of the implement to which the seed and fertilizer feeder is applied. Each of the dropper boxes 37 is closed at its upper end by a sheet metal lid 63 releasably held in place by the engagement of spring clips 64, secured below the lid, with a bear 65 formed about the upper part of the dropper box.

In use, the seed and fertilizer feeder is mounted, as described, on a tined implement, the flexible delivery hoses 62 from the dropper box outlets 38 being carried down to seed boots in rear of the tines, and the land-wheel 58 resting on the ground to the rear of the implement. Seed is fed into the seed compartment 21, fertilizer into the fertilizer compartment 22. As the implement is drawn forward, by means of a tractor, the land-wheel 58 is rotated and, through the cable 60, drives the spur gear 52, which causes the spur gears 51 and 50 to be counter-rotated. Consequently, the seed conduits 27 will be rotated in one direction, the fertilizer conduits 28 in opposite direction. The parts of the device are so made and arranged that, as a result, the helical conveyors 35 and 36 of the seed and fertilizer conduits 27 and 28 will act to convey seed and fertilizer from their compartments in the hopper 10 through the said conduits towards the outlet holes 48. The action of the agitators 45 associated with the seed conduits 27 will ensure that the seed, even if of a hairy nature, will not be liable to become packed, but will freely enter the inlet openings 44 of the seed conduits. The gentle tumbling action to which the seeds are subjected within the seed conduits 27 will ensure that they are fed towards the outlet openings 48 separately, and will be fed through the said openings into the dropper boxes 37 at a rate readily controllable by adjustment of the masking tubes 49 associated with the seed conduits. At the same time, fertilizer will be carried through the fertilizer conduits 28 to the outlet holes thereof, and fed into the dropper boxes. Consequently, controlled delivery of seed and fertilizer to the dropper boxes 39, and thus to the openings made by the tines of the implement, will be ensured.

For clarity of illustration, and to simplify the description of the invention, the seed and fertilizer feeder herein described and illustrated is adapted to convey seed and fertilizer to two delivery points only; but in many cases it will, of course, be desirable that there should be a number of delivery points over a fairly wide front. In such a case, the mounting tubes 25 are considerably longer, and a series of dropper boxes 37 are mounted to each side of the hopper. The seed and fertilizer conduits may be made correspondingly longer; or I may prefer to connect extension to the conduits as above described and herein illustrated. In such a case, the plugs 42 are removed from the outer ends of the existing conduits, and to each conduit one or more extensions are connected, each consisting, for example, of a length of metal tube similar to that of the existing conduits, each extension having a helical conveyor, as described, fitted closely within it, and having outlet holes, as described, located within one or more additional dropper boxes, such outlets being controllable as described.

Again, in certain cases I may prefer that the hopper should be mounted to one side of the implement, seed and/or fertilizer conduits extending towards the other side and serving one or more dropper boxes.

If desired, a pair of fertilizer conduits, as shown in the drawings, may have their helical conveyors 36 extending inwardly into the fertilizer compartment, to desired extent.

The inlets to the seed conduits may be altered to suit different kinds of seed. For example, the inner ends of the conduits may be about flush with the inner sides of the hopper side plates 11, the helical conveyors extending further inwards. Agitators may not be required in certain cases, and may be omitted.

My invention also contemplates the use of a rotary more or less cylindrical hopper, with a co-axial seed or fertilizer conduit, with enclosed helical conveyor, extending to one or both ends, the whole being mounted so that the hopper, with conduits and conveyors, may be rotated.

What I claim is:

1. A seed or fertilizer feeder including a hopper for seed and/or fertilizer; a dropper box; a rotatable feed conduit leading from the hopper to the dropper box; an inlet to the feed conduit from the hopper; outlet apertures from the wall of the feed conduit into the dropper box; a metering sleeve slidable on the feed conduit and adapted to limit the effective area of the outlet apertures; a helical conveyor extending inwardly from the inner wall of the feed conduit; and means for rotating the feed conduit and helical conveyor in such direction as to convey seed and/or fertilizer from the hopper through the outlet apertures into the dropper box.

2. A seed or fertilizer feeder including a hopper; a seed compartment and a fertilizer compartment within the hopper; a dropper box to each side of the hopper; a rotatable seed feed conduit leading from each side of the seed compartment to a dropper box; a rotatable fertilizer feed conduit leading from each side of the fertilizer compartment to a dropper box; outlet apertures from the wall of each seed conduit into a dropper box; outlet apertures from the wall of each fertilizer conduit into a dropper box; metering sleeves slidable on each of the feed conduits and adapted to limit the effective area of the outlet apertures thereof; a helical conveyor extending inwardly from the inner wall of each of the feed conduits; and means for rotating all of the feed conduits in such directions as to convey seed and fertilizer from the seed and fertilizer compartments through the outlet apertures to the dropper boxes.

3. A seed or fertilizer feeder according to claim 2 wherein the seed conduits extend into the seed compartment, inlet apertures are formed through the walls of the inner parts of the conduits, and agitators are secured to the inner parts of the seed conduits.

4. A seed or fertilizer distributor according to claim 2 wherein the means for rotating the feed conduits includes a ground wheel operatively connected to the feed conduits.

References Cited in the file of this patent

UNITED STATES PATENTS 106,147   Adt _____ Aug. 9, 1870